US011023918B1

(12) United States Patent
D'Andrea et al.

(10) Patent No.: US 11,023,918 B1
(45) Date of Patent: Jun. 1, 2021

(54) INCENTIVES FOR PHYSICAL ACTIVITY

(71) Applicant: Wells Fargo Bank, N.A., San Francisco, CA (US)

(72) Inventors: Michael Glynn D'Andrea, Burlington, VT (US); John Edward Cronin, Bonita Springs, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/829,388

(22) Filed: Mar. 25, 2020

Related U.S. Application Data

(62) Division of application No. 15/141,509, filed on Apr. 28, 2016, now Pat. No. 10,643,231.

(51) Int. Cl.
*G06Q 30/02* (2012.01)

(52) U.S. Cl.
CPC .............................. *G06Q 30/0235* (2013.01)

(58) Field of Classification Search
None
See application file for complete search history.

(56) References Cited

U.S. PATENT DOCUMENTS

| | | | |
|---|---|---|---|
| 8,812,260 B2 | 8/2014 | Yuen et al. | |
| 9,081,534 B2 | 7/2015 | Yuen et al. | |
| 9,089,760 B2 | 7/2015 | Tropper et al. | |
| 2004/0098306 A1 | 5/2004 | Fitzpatrick et al. | |
| 2005/0102172 A1 | 5/2005 | Sirmans | |
| 2006/0025282 A1 | 2/2006 | Redmann | |
| 2007/0247306 A1* | 10/2007 | Case, Jr. | ............ G06Q 30/0261 340/539.11 |
| 2012/0215328 A1 | 8/2012 | Schmelzer | |
| 2013/0027227 A1* | 1/2013 | Nordstrom | ......... G06Q 30/0205 340/990 |
| 2013/0117041 A1 | 5/2013 | Boyce et al. | |
| 2013/0332274 A1 | 12/2013 | Faith et al. | |
| 2014/0278850 A1* | 9/2014 | Boccuzzi, Jr. | ..... G06Q 30/0208 705/14.11 |
| 2014/0279011 A1* | 9/2014 | McMullen | ......... G06Q 30/0261 705/14.58 |
| 2015/0142689 A1 | 5/2015 | Squires | |
| 2016/0048860 A1 | 2/2016 | Sayler et al. | |

(Continued)

OTHER PUBLICATIONS

Jang Yul Kwak—Dissertation—Determinants of Users' Intention To Adopt Mobile Fitness Applications: An Extended Technology Acceptance Model Approach, University of New Mexico, 2014 (Year: 2014).*

*Primary Examiner* — Michael J Sittner
(74) *Attorney, Agent, or Firm* — Merchant & Gould P.C.

(57) ABSTRACT

A method for rewarding physical activity is disclosed. At a server computer, goal data is received from a user device for a user. The goal data comprises a description of a physical activity for traveling to a location of a retailer within a time goal. The goal data includes a reward to be provided to the user for completing the physical activity within the time goal. User data is received from the user device. The user data includes data from an activity monitor and geolocation data. Based on the user data, a determination is made as to whether the user has completed the physical activity within the time goal. When the determination is made that the user has completed the physical activity within the time goal, the reward is provided to the user.

1 Claim, 15 Drawing Sheets

(56) References Cited

U.S. PATENT DOCUMENTS

| | | | |
|---|---|---|---|
| 2016/0089569 A1* | 3/2016 | Blahnik | ........... G06Q 30/02 434/247 |
| 2018/0247327 A1* | 8/2018 | Cronin | ........... G06Q 30/0214 |

\* cited by examiner

| Participating Retailers | | | | | Rewards | |
|---|---|---|---|---|---|---|
| 902 Retailer | 904 Store Name | 906 Location | 908 Hours | 910 Product Category | 912 Tier 1 Promo | 914 Tier 2 Promo |
| Starbucks | Starbucks | X, Y, Z | Sched1234.dat | Coffee | 5% off purchase | 10% off purchase |
| Starbucks | Starbucks | X, Y, Z | Sched2345.dat | Coffee | 5% off purchase | 10% off purchase |
| Starbucks | Starbucks | X, Y, Z | Sched3456.dat | Coffee | 5% off purchase | 10% off purchase |
| Starbucks | Starbucks | X, Y, Z | Sched4567.dat | Coffee | 5% off purchase | 10% off purchase |
| Starbucks | Starbucks | X, Y, Z | Sched5678.dat | Coffee | 5% off purchase | 10% off purchase |
| Starbucks | Starbucks | X, Y, Z | Sched6789.dat | Coffee | 5% off purchase | 10% off purchase |
| Starbucks | Starbucks | X, Y, Z | Sched7890.dat | Coffee | 5% off purchase | 10% off purchase |
| Visa | Kohl's | X, Y, Z | Sched8901.dat | Clothing | 100 bonus rewards points | 200 bonus rewards points |
| Visa | Target | X, Y, Z | Sched9012.dat | Home Goods | 100 bonus rewards points | 200 bonus rewards points |
| Visa | Home Depot | X, Y, Z | Sched0123.dat | Home Improvement | 100 bonus rewards points | 200 bonus rewards points |
| Visa | Panera Bread | X, Y, Z | Sched9876.dat | Dining | 100 bonus rewards points | 200 bonus rewards points |
| Visa | Lowe's | X, Y, Z | Sched8765.dat | Home Improvement | 100 bonus rewards points | 200 bonus rewards points |
| Visa | Target | X, Y, Z | Sched7654.dat | Home Goods | 100 bonus rewards points | 200 bonus rewards points |
| Visa | Ruth's Chris | X, Y, Z | Sched6543.dat | Dining | 100 bonus rewards points | 200 bonus rewards points |

1402
Calculate user's average speed (minutes/mile)

1404
Calculate distance from user location to retailer location

1406
Calculate time for user travel distance to retailer location

1408
Send time at user's average speed to user device as tier 1 goal time

1410
Send 90% of time at user's average speed as tier 2 goal time

FIG. 14

INCENTIVES FOR PHYSICAL ACTIVITY

BACKGROUND

Businesses commonly provide incentives to encourage prospective customers to sample products. The incentives can take the form of coupons that provide a discounted price on one or more of the products and rewards that can provide free products or gifts to encourage the prospective customers.

SUMMARY

Embodiments of the disclosure are directed to a method implemented on a server computer for rewarding physical activity, the method comprising: at the server computer, receiving from a user device goal data for a user, the goal data comprising a description of a physical activity for traveling to a location of a retailer within a time goal, the goal data including a reward to be provided to the user for completing the physical activity within the time goal; receiving user data from the user device, the user data including data from an activity monitor and geolocation data; based on the user data, determining whether the user has completed the physical activity within the time goal; and when a determination is made that the user has completed the physical activity within the time goal, providing the reward to the user.

In another aspect, a method implemented on an electronic computing device for financial rewarding physical activity comprises: on a display screen of the electronic computing device, rendering a first user interface showing available product categories associated with a financial incentive for physical activity; receiving a first selection of a product from the available product categories; as a result of receiving the first selection of the product, rendering a second user interface showing names of local retailers from which the product can be obtained and showing distances from a current location of the user to the local retailers; receiving a second selection of a local retailer; and rendering a third user interface showing progress towards at least one time goal for the user to travel to the local retailer.

In yet another aspect, a first electronic computing device includes a processing unit; and system memory, the system memory including instructions which, when executed by the processing unit, cause the first electronic computing device to: obtain names of local retailers that provide rewards for physical activity; obtain geolocation data for each of the local retailers; obtain goal data corresponding to the rewards for the physical activity; send to a user device the names of the local retailers, a geolocation for each of the local retailers and the goal data; receive from the user device a first selection of a local retailer, a second selection of a goal associated with the local retailer and a first geolocation of the user device; calculate a first time duration for the user to travel to a location of the local retailer, the first time duration representing a first goal for the user; calculate a second time duration for the user to travel to the location of the local retailer, the second time duration being a percentage of the first time duration, the send time duration representing a second goal for the user; send the first time duration and the second time duration to the user device; receive a first message from the user device indicating that the first time duration has expired; obtain a second geolocation of the user device, the second geolocation corresponding to a geolocation of the user device at a time when the first time duration expires; determine whether the second geolocation of the user device corresponds to the geolocation of the local retailer; designate that the first goal has been achieved; and assign a first reward to the user; and when the determination is made that the second geolocation does not correspond to the geolocation of the local retailer: receive a second message from the user device indicating that the second time duration has expired; obtain a third geolocation of the user device, the third geolocation corresponding to the geolocation of the user device at the time when the second time duration expires; determine whether the third geolocation of the user device corresponds to the geolocation of the local retailer; and when a determination is made that the third geolocation of the user device corresponds to the geolocation of the local retailer: designate that the second goal has been achieved; and assign a second reward to the user.

The details of one or more techniques are set forth in the accompanying drawings and the description below. Other features, objects, and advantages of these techniques will be apparent from the description, drawings, and claims.

DESCRIPTION OF THE DRAWINGS

FIG. 9 shows an example structure of a retailer database of the system of FIG. 1.

FIG. 14 shows an example method for calculating the user's goals.

DETAILED DESCRIPTION

Figure 1:
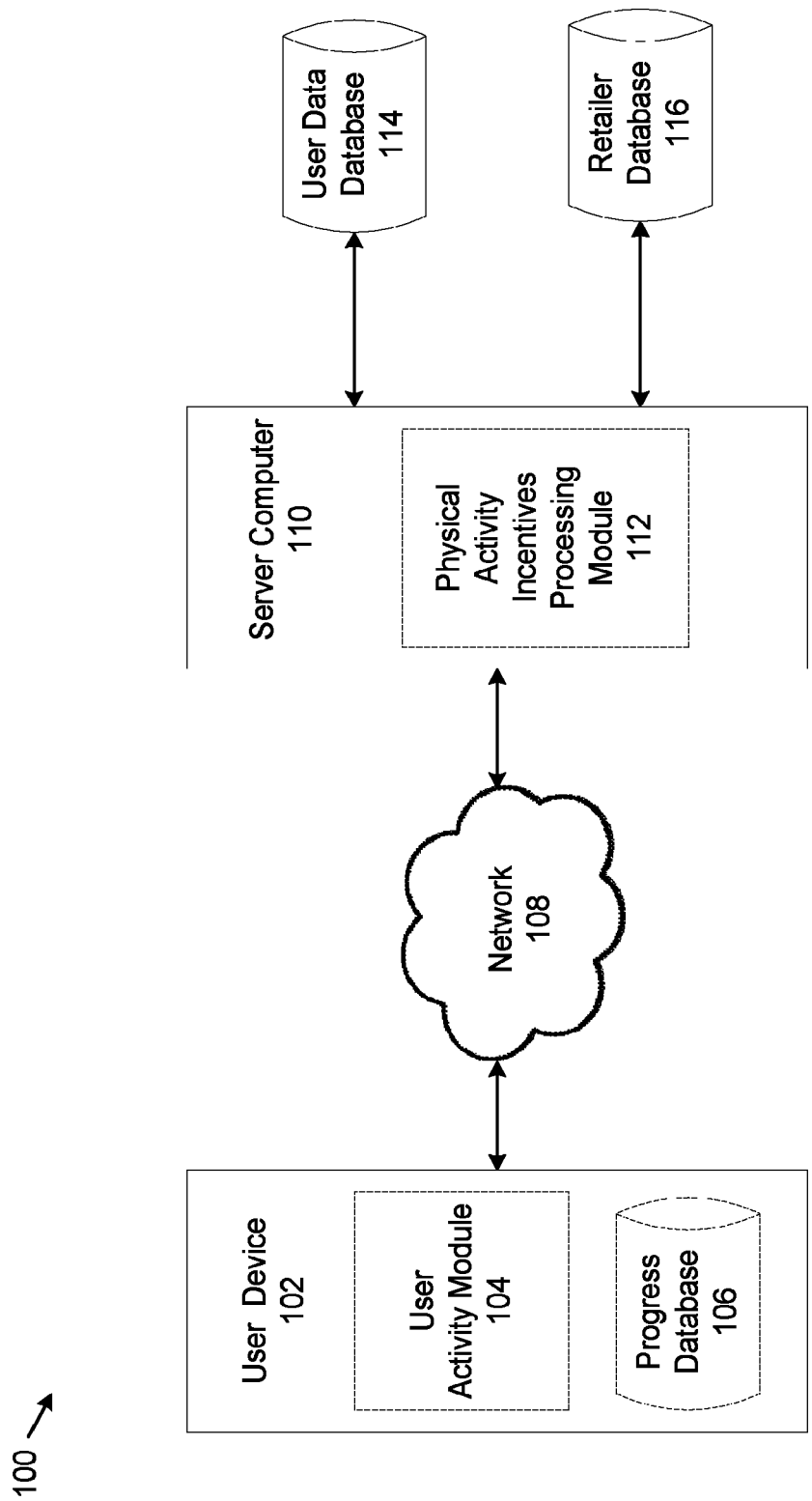
FIG. 1 shows an example system that supports incentives to physical activity.

The present disclosure is directed to systems and methods that can provide incentives for people to engage in physical activity. Using the systems and methods, a user device such as a smart phone can display product offers from local retailers. The product offers can include a discount or reward for engaging in the physical activity.

The user device can include an activity monitor that can track user progress towards the local retailer, global positioning system (GPS) software that can track the user's location and a timer that can time the user's progress. When a time duration of a specified time goal is reached, the user device can send progress information for the user to an electronic computing device, such as a server computer. The server computer can determine whether the user has arrived at the local retailer at or before the time duration of the time goal. When a determination is made that the user has satisfied the time goal, the user can receive a reward associated with the time goal.

The user device can display offers for a plurality of products. When the user selects a product, the user device can identify a plurality of local retailers within walking distance of the user that provide financial incentives, such as rewards and discounts, for walking to the local retailers. As discussed in more detail later herein, distances from a current location of the user to the locations of the local retailers can be displayed. The user can select a local retailer based on how far the local retailer is from the user. In an example implementation, the greater distance the user has to walk to the local retailer, the greater the reward that can be earned by the user.

The electronic computing device, such as the server computer, can be an electronic computing device at a business or other organization that can provide financial incentives to the users. The business or other organization can have an arrangement with the local retailer whereby the local retailer can provide a portion of the financial incentive. The local retailer may be motivated to participate because the financial incentive program can bring added business and new customers to the local retailer. The business or other organization can be motivated by encouraging an environment that promotes health and by attracting new patrons of the business or other organization that may be attracted by offers of financial incentives for physical activity. In the present application, the financial incentives are described as being offered by a financial institution.

The systems and methods can also be implemented differently that described above. In one alternative example, instead of monitoring walking, the activity monitor can be configured to monitor a different type of physical activity, such as running, jogging, biking or skating. When a physical activity other than walking is used, time goals for financial incentives for traveling to the local retailer can be based on an average time for traveling to the local retailer using the physical activity other than walking. In another alternative embodiment, the system can use a time based upon averages for a specific user (e.g. the user may be a fast runner with a quicker than average time). Further, incentives can be provided for faster activities—such as a bigger incentive if the user decides to run rather than walk with a shorter time period.

In yet another alternative example, the activity monitor can monitor different types of physiological parameters. For example, one goal could be reaching a heart rate up to 120 for at least 80% of the trip from the current location of the user to the local retailer. In yet another alternative example, there can be competition between users for rewards. For example, when there are multiple users, rewards can be based on an order in which the users arrive at a same retail store from a same starting position. The sooner a user arrives, the greater the reward the user receives. Other implementations are possible.

The systems and methods disclosed herein are directed to a computer technology that can improve marketing and sales opportunities for organizations. Local retailers can increase a customer base by offering discounts and rewards. Financial organizations can also increase their customer base by supporting and advertising local retailers who provide financial incentives and by encouraging healthy physical activity amount their customers. In addition, computer systems and devices among the local retailers, users and the financial institution can be interconnected and integrated in an efficient manner to provide offers, monitor physical activity and provide rewards to customers.

FIG. 1 shows an example system 100 that supports financial incentives to physical activity. The system 100 includes a user device 102, a network 108, a server computer 110, a user data database 114 and a retailer database 116. The user device 102 includes a user activity module 104 and a progress database 106. The server computer 110 includes a physical activity incentives processing module 112. More, fewer or different components can be used.

The example user device 102 is a mobile electronic computing device, such as a smartphone, a tablet computer or a smart watch. The user device 102 includes global positioning system (GPS) software that can determine a geolocation of the user device 102. The user device 102 also includes a software application that implements the user activity module 104. System 100 can include a plurality of user devices.

The example user activity module 104 renders a series of graphical user interfaces (GUIs) that permit a user at user device 102 to select products and local retailers for which financial rewards can be obtained through physical activity. The physical activity comprises walking from a current location of the user to a location of a selected local retailer within a specified time goal. The specified time goal is based on an average walking speed of the user. The user activity module 104 also monitors steps taken by the user as the user walks to the local retailer. As discussed in more detail later herein, a determination of a number of steps taken by the user can determine whether the user has actually walked to the local retailer or taken some other form of transportation to the local retailer.

The example progress database 106 stores data regarding the user's physical activity. The data can include distances walked on different days, a time duration taken to walk the distance and the number of steps taken by the user to walk the distance. The progress database 106 is described in more detail later herein.

The example network 108 is a computer network, such as the Internet, that can permit communication between user device 102 and server computer 110.

The example server computer 110 is a server computer at a financial institution, such as a bank. The financial institution can have a promotion associated with various local retailers to encourage prospective customers to purchase products from the local retailers. The financial institution can offer discounts on products from the local retailers based on the prospective customer achieving a physical activity goal, such as walking to the location of the local retailer within a specified time goal.

The example physical activity incentives processing module 112 can provide product and incentive information from the local detailers to user device 102 and to any other user devices in system 100 that support financial incentives for physical activity. The physical activity incentives processing module 112 also receives activity data from user device 102 and determines when target activity goals for the user have been met. The physical activity incentives processing module 112 is discussed in more detail later herein.

The example user data database 114 stores historical physical activity data for a plurality of users. As discussed in more detail later herein, the physical activity data can include distances, time durations for walking the distances and steps taken in walking the distances. Other historical data is possible. The user data database 114 is accessible from server computer 110. In some implementations, the user data database 114 can reside on server computer 110.

The example retailer database 116 stores promotional data for a plurality of local retailers. As discussed in more detail later herein, the promotional data can include local retailer names, product categories available promotion and two levels of promotions, based on how long it takes user to walk to the local retailer. Other promotional data is possible. The retailer database 116 is accessible from server computer 110. In some implementations, the retailer database 116 can reside on server computer 110.

Figure 2:
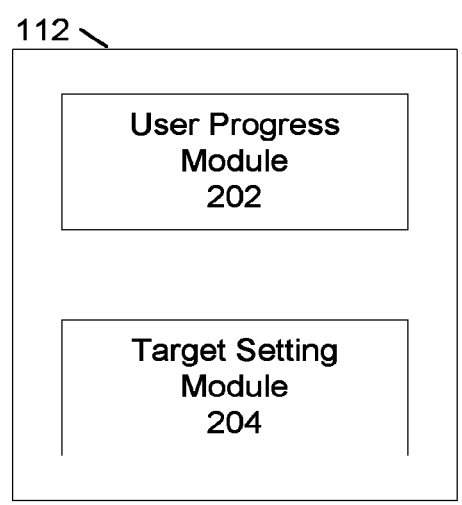
FIG. 2 shows example modules of the physical activity incentives processing module of FIG. 1.

FIG. 2 shows example modules of the physical activity incentives processing module 112. The physical activity incentives processing module includes a user progress module 202 and a target setting module 204.

The example user progress module 202 receives user geolocation data and selected product and retailer information from user device 102. The data and information are used by the target setting module 204 to set target goals for the user. The user progress module 202 also can keep track of time and a geolocation of user device 102 as the user walks to the selected local retailer location. When the user progress module 202 determines that a timer for a tier 1 goal or tier 2 goal has expired, the user progress module 202 can obtain a current geolocation of user device 102 and send the current geolocation of user device 102 to server computer 110. A determination can then be made at server computer 110 as to whether the user achieved the tier 1 goal or tier 2 goal, as explained in more detail later herein.

Figure 3:
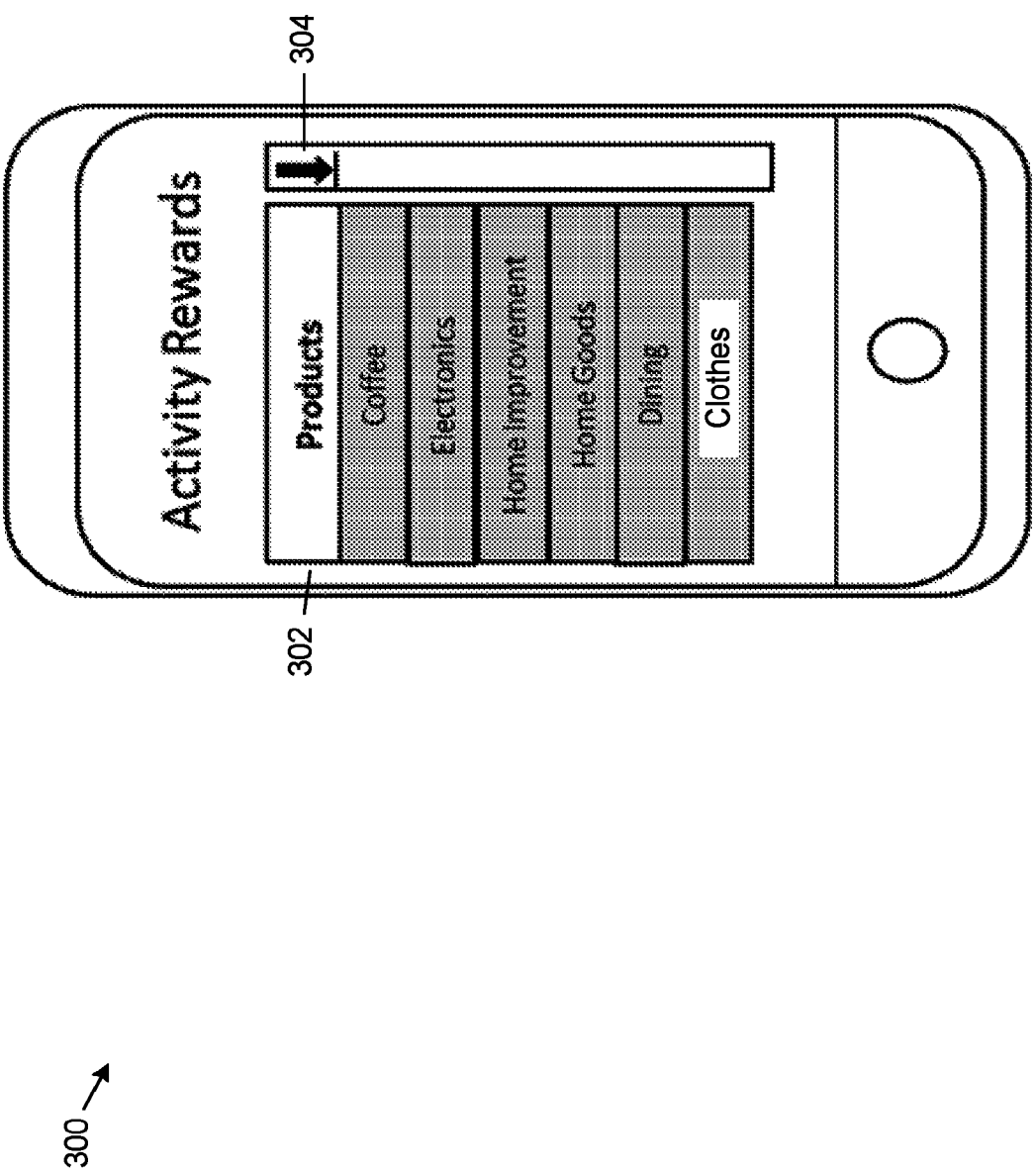
FIG. 3 shows an example user interface screen that can be displayed on the user device of FIG. 1.

FIG. 3 shows an example user interface screen 300. The user interface screen 300 can be displayed on user device 102 when the user activates the software application that implements the user activity module 104. The user interface screen 300 displays a list 302 of products that are available an area within walking distance of user device 102 for which financial rewards are available based on physical activity of the user. As shown in FIG. 3, the available products include coffee, electronics, home improvement, home goods, dining and clothes. The user interface screen 300 also includes a scroll bar 304 that can be used to view additional available products.

Figure 4:
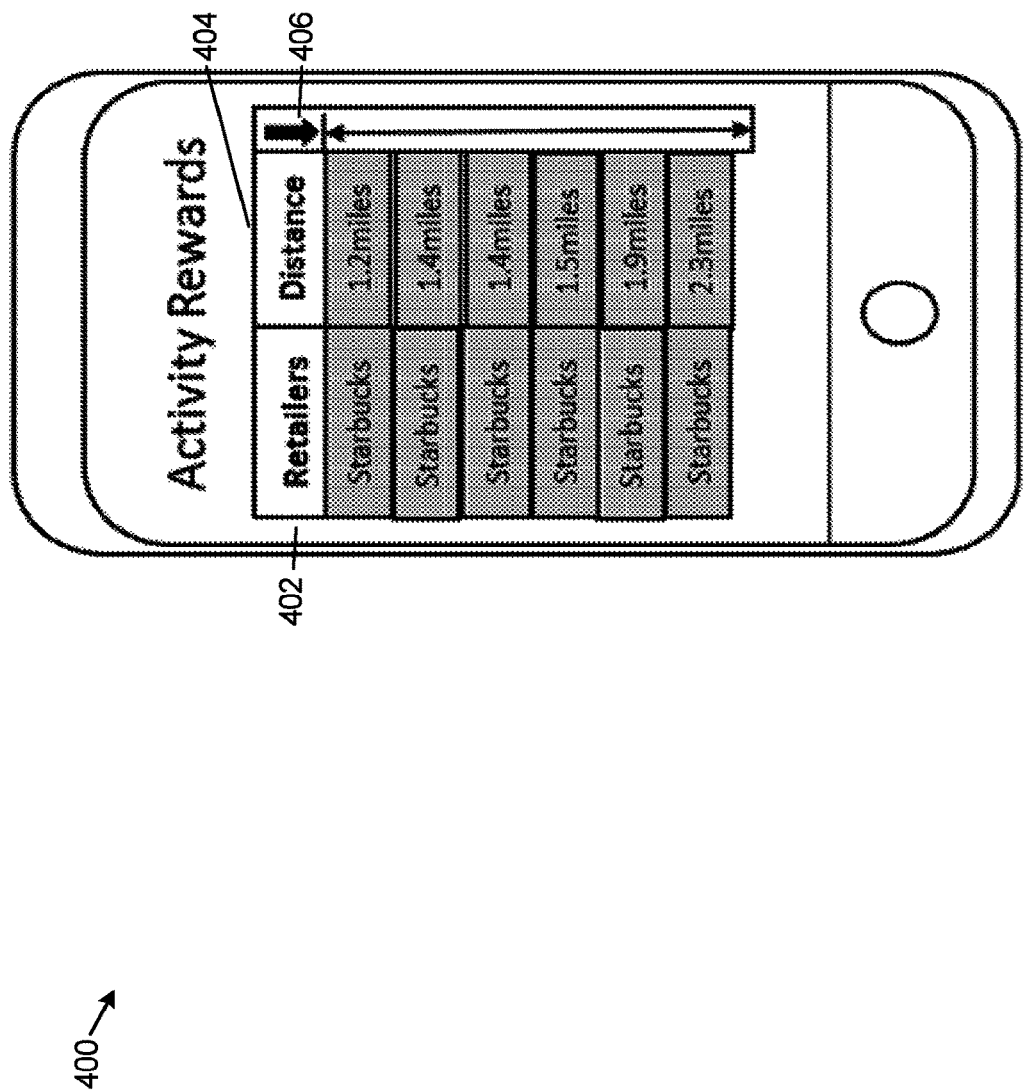
FIG. 4 shows another example user interface screen that can be displayed on the user device of FIG. 1.

FIG. 4 shows an example user interface screen 400. The user interface screen 400 is displayed when the user selects Coffee from user interface screen 300. The user interface screen 400 displays names 402 of local retailers available in the area within walking distance of user device 102 for which financial awards are available based on physical activity of the user. The user interface screen 400 also displays a distance of reach retailer to a current location of the user. For example, the user interface screen 400 shows that there are six Starbucks coffee shops located between 1.2 miles and 2.3 miles from the current location of the user. When the user selects one of the Starbucks coffee shops, a reward for each Starbucks coffee shop can be displayed. In some implementations, in order to encourage physical activity, the rewards can be greater the greater the distance a Starbucks coffee shop is from the current location of the user. The user interface screen 400 also includes a scroll bar 406 that can be used to view additional retailers.

Figure 5:
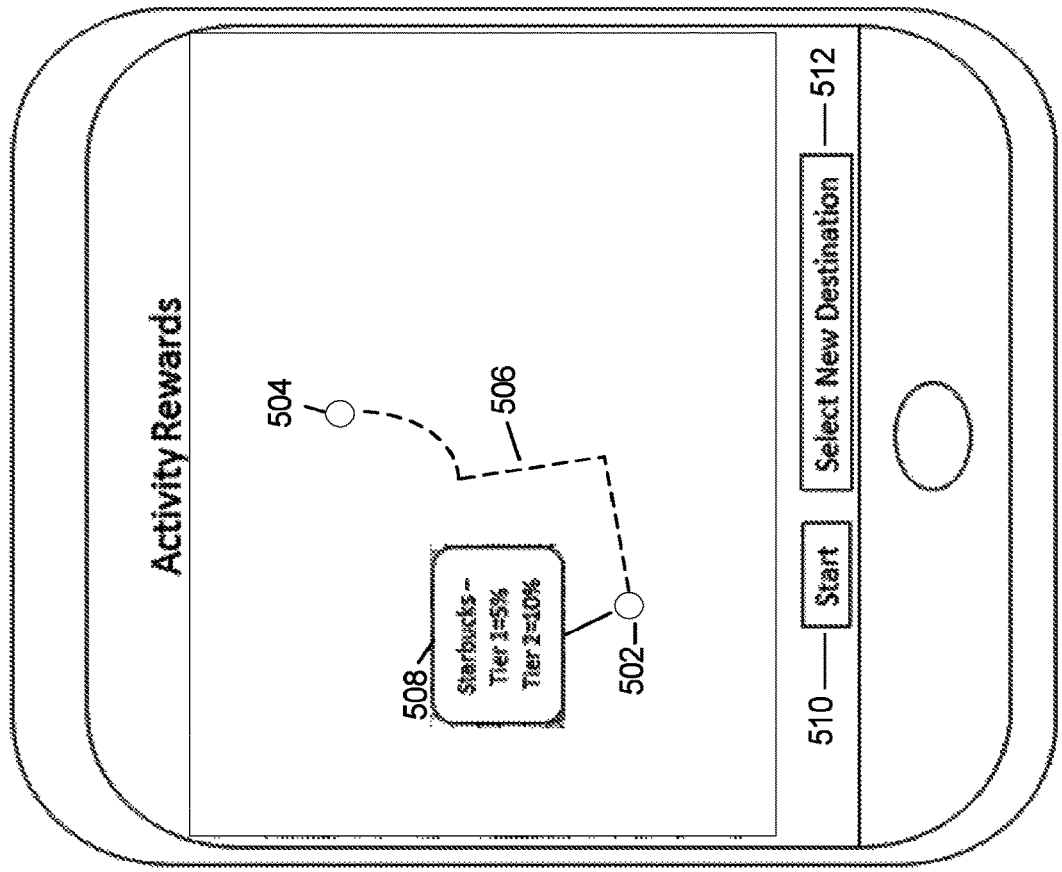
FIG. 5 shows yet another example user interface screen that can be displayed on the user device of FIG. 1.

FIG. 5 shows an example user interface screen 500. The user interface screen 500 is displayed when the user selects one of the Starbucks coffee shops from the user interface screen 400. The user interface screen 500 displays an example map showing a current location 502 of the user, a location 504 of the selected Starbucks coffee shop and a recommended travel route 506 from the current location 502 of the user to the location 504 of the selected Starbucks coffee shop.

The user interface screen 500 also displays rewards 508 available at the selected Starbucks coffee shop. As shown, in FIG. 4, two rewards are available—a tier 1 reward of a 5% discount and a tier 2 reward of a 10% discount. For the example system 100, the tier 1 reward is based on the user walking the distance from the current location 502 of the user to the location 504 of the selected Starbucks coffee shop within a first time duration based on an average walking speed for the user. The average walking speed for the user is calculated once the user accepts the reward offer. For system 100, the tier 2 reward is based on the user walking the distance at a second time duration equal to 90 percent of the first time duration. In other implementations, a percentage other than 90 percent can be used. Because the user needs to walk faster in order to win the tier 2 reward, the tier 2 reward of the 10% discount is greater than the tier 1 reward of the 5% discount.

The user interface screen 500 also includes an example Start button 510 and an example Select New Destination button 512. The user can select the reward offer from the selected Starbucks coffee shop by selecting the Start button 510. Alternatively, the user can select a new destination by selecting the Select New Destination button 512.

Figure 6:
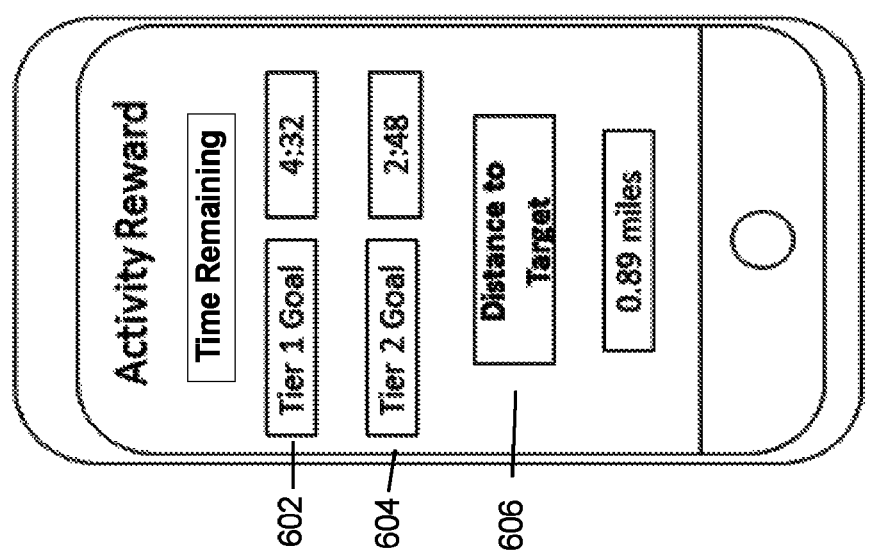
FIG. 6 shows yet another example user interface screen that can be displayed on the user device of FIG. 1.

FIG. 6 shows an example user interface screen 600. The user interface screen 600 is displayed when the user selected the Start button 510. The user interface screen 600 displays a time remaining for a tier 1 goal 602, a time remaining for a tier 2 goal 604 and a distance 606 to a target of the selected Starbucks coffee shop. As shown in FIG. 6, the time remaining to achieve the tier 1 goal is 4 minutes and 32 seconds, the time remaining to achieve the tier 2 goal is 2 minutes and 48 seconds and the distance to the selected Starbuck's coffee shop is 0.89 miles.

Figure 7:
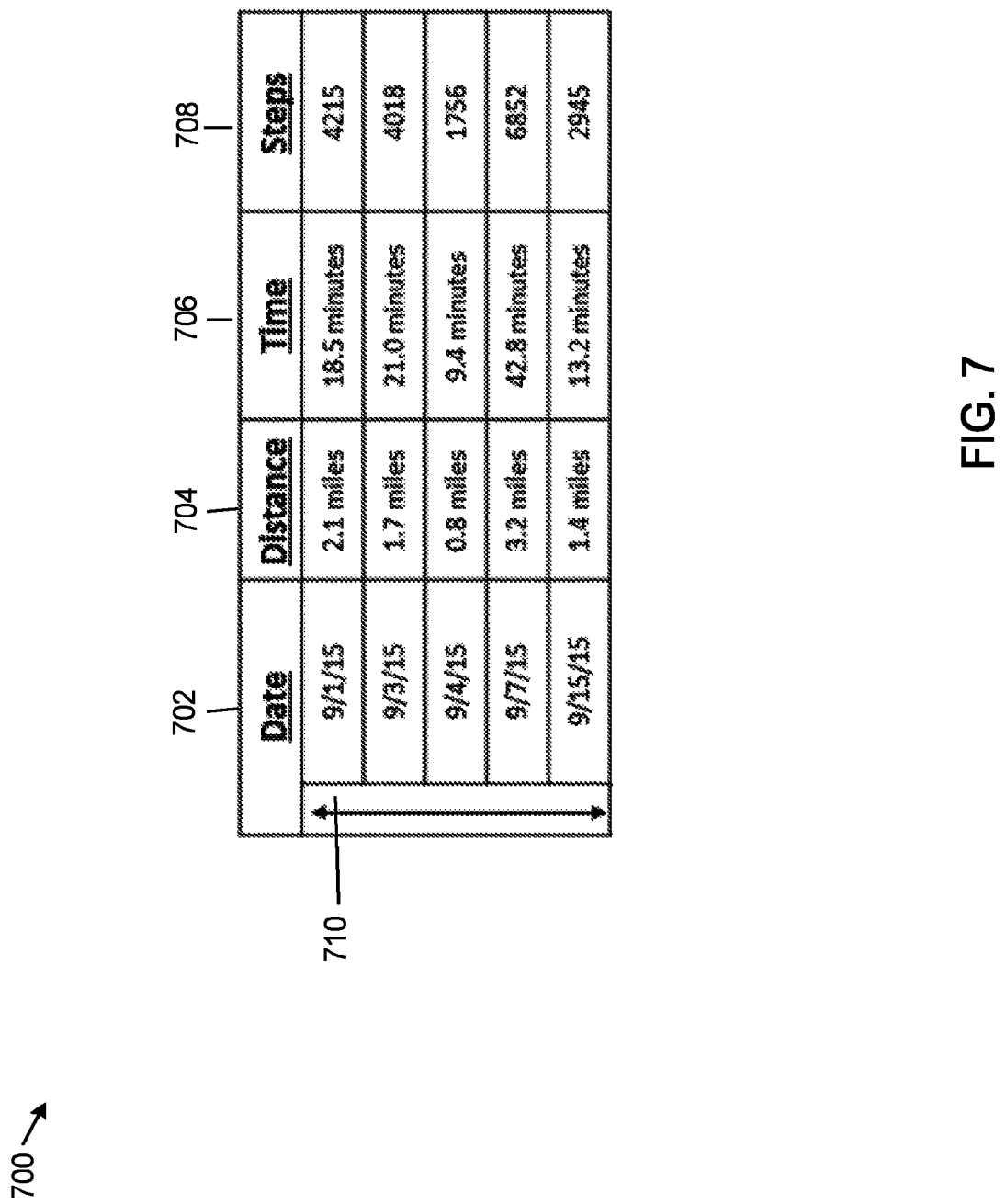
FIG. 7 shows an example structure of a progress database of the system of FIG. 1.

FIG. 7 shows an example structure 700 of the progress database 106. The progress database 106 stores activity data for the user of user device 102. The progress database 106 includes columns for a date 702, a distance 704 walked by the user, a time 706 taken for the user to walk from the user's starting location to a location of a selected retailer and a number of steps 708 taken by the user when the user walked from the user's starting location to the location of the selected retailer. As an example, row 710 of the progress database 106 shows that on Sep. 1, 2015, the user walked a distance of 2.1 miles in 18.5 minutes and took 4215 steps.

Figure 8:
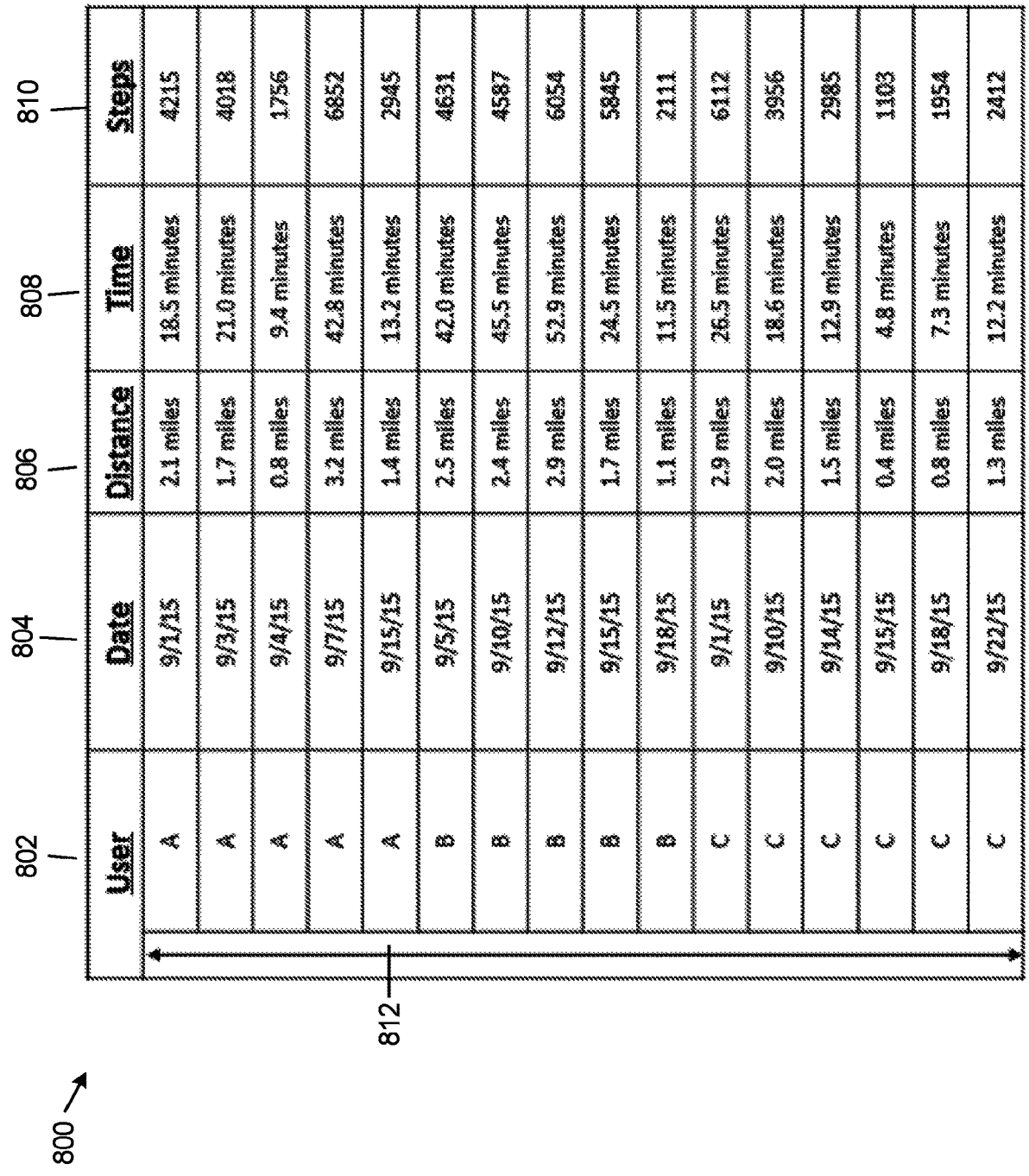
FIG. 8 shows an example structure of a user database of the system of FIG. 1.

FIG. 8 shows an example structure 800 of the user data database 114. The user data database 114 stores user data for a plurality of users and is accessible from server computer 110. The user data database 114 includes columns for a user 802, a date 804, a distance 806 walked by the user, a time 808 taken for the user to walk from the user's starting location to a location of a selected retailer and a number of steps 810 taken by the user when the user walked from the user's starting location to the location of the selected retailer. As shown in FIG. 8, the user data database 114 stores activity data for three users—user A, user B and user C. As an example, the fifth row 812 of the user data database 114 shows that on Sep. 15, 2015 user A walked a distance of 1.4 miles in 13.2 minutes and took 2945 steps.

FIG. 9 shows an example structure 900 of the retailer database 116. The retailer database 116 stores names, locations and product categories and rewards for local retailers participating in a program of financial incentives for physical activity. The retailer database 116 includes columns for retailer 902, store name 904, store location 906, store hours 908, product category 910, tier 1 promotion reward 912 and tier 2 promotion reward 914. As shown in the columns for retailer 902 and store name 904, the retailer 902 and the store name 904 are not necessarily the same. For example, retailer Visa can have promotions at a plurality of stores including Kohl's, Target, Panera Bread, Lowe's and Ruth's Chris. Also as shown in the tier 1 promotion reward 912 and tier 2 promotion reward 914 columns, rewards can be either a percentage off the purchase or bonus points. In addition, for the structure 900, the store hours 908 can be stored as a link to a database area (for example Sched1234.dat) that contains information regarding store hours.

Figure 10:
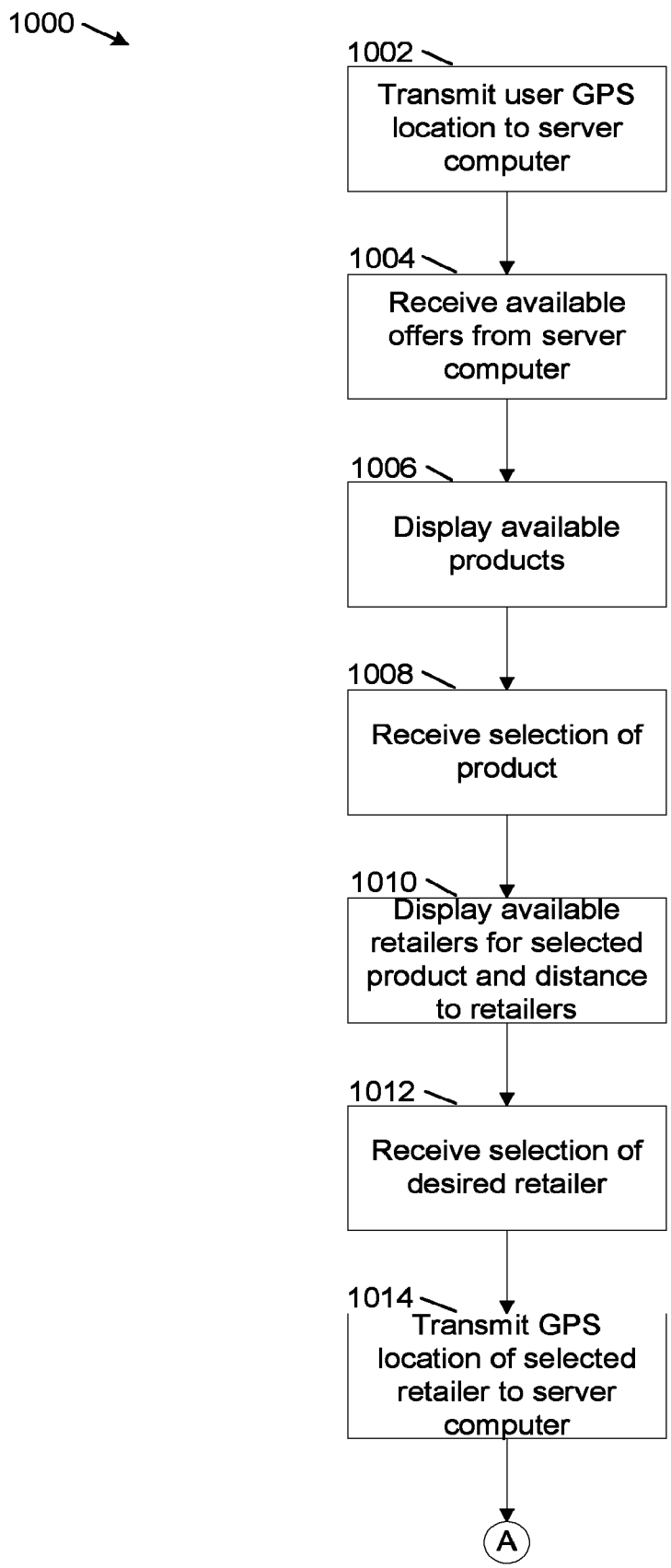
FIG. 10 shows a first part of an example method for selecting and participating in incentives for physical activity.
Figure 11:
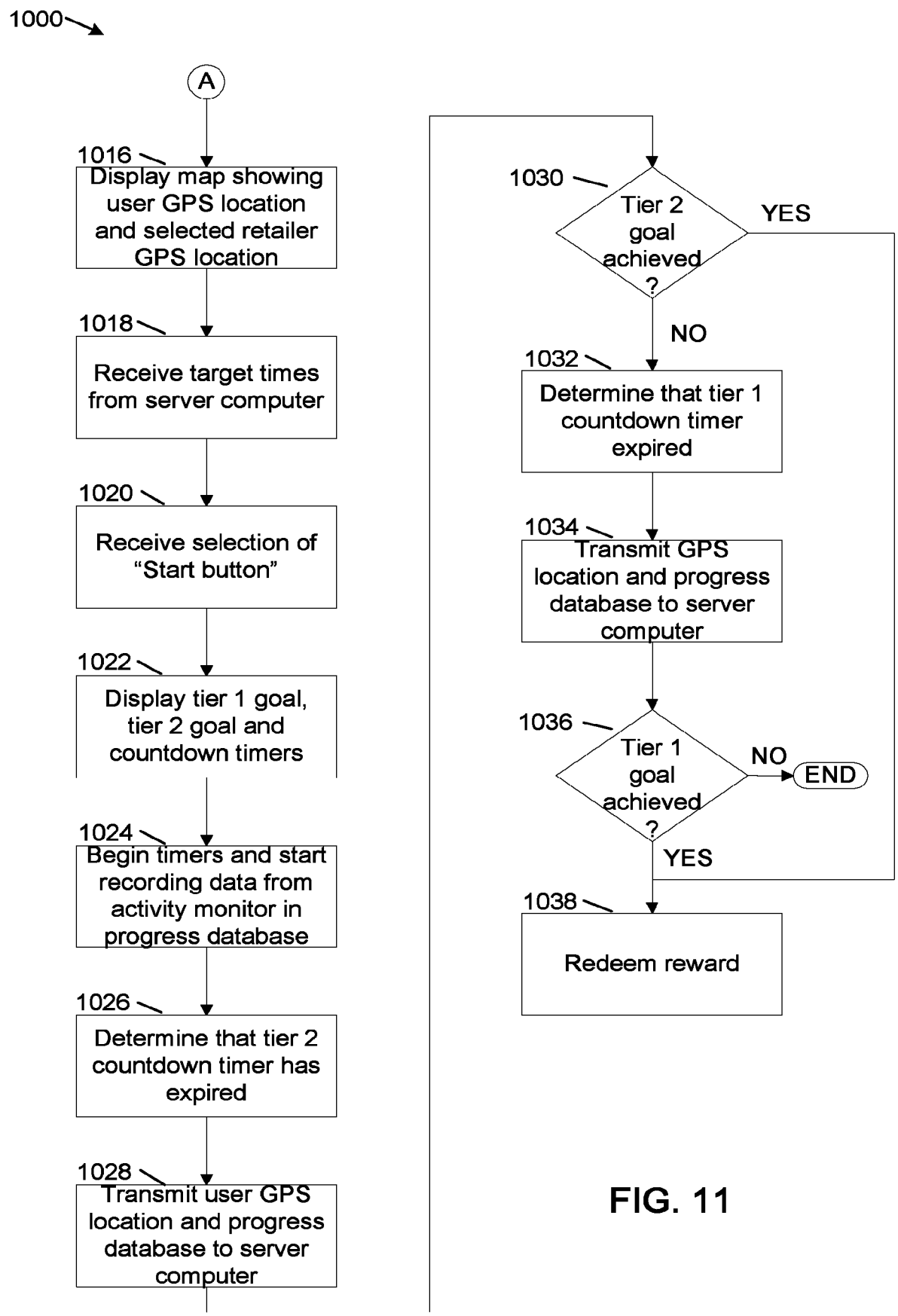
FIG. 11 shows a second part of the example method of FIG. 10.

FIGS. 10 and 11 show a flowchart of an example method implemented on user device 102 for selecting and participating in financial incentives for physical activity. The method is implemented when a user on user device 102 activates a software application for financial incentives for physical activity.

At operation 1002, user device 102 transmits a current GPS location of user device 102 to server computer 110.

At operation 1004, server computer 110 sends available offers for financial incentives to user device 102. The offers comprise incentives to purchase products at local retailers within walking distance of user device 102. The local retailers participate in a financial incentive program to reward physical activity of the user with discounts or reward points for the products purchased at the local retailers.

At operation 1006, a list of products for which incentives are available from the local retailers is displayed on user device 102. The products can be displayed as product broad product categories, such as coffee, electronics, home improvement, home goods, dining and clothes. Other product categories are possible.

At operation 1008, a user at user device 102 selects one of the available product categories. The selected product category is received at user device 102.

At operation 1010, a list of available retailers and a distance to the available retailers from a current location of user device 102 is displayed for the product category selected at operation 1008. The available retailers are local retailers within walking distance of the current user location and that are currently open for business.

At operation 1012, the user at user device 102 selects one of the local retailers. The selection of the local retailer is received at user device 102.

At operation 1014, user device 102 transmits a GPS location of the selected retailer to server computer 110.

At operation 1016, a map is displayed on user device 102 (similar to the map shown in FIG. 5), showing the user GPS location and the GPS location of the selected local retailer. The map can also show a preferred route from the current location of user device 102 to the local retailer.

At operation 1018, target times are received from server computer 110. The target times comprise a tier 1 goal and a tier 2 goal. The tier 1 goal is a time duration for the user to walk from the current location of user device 102 to the local retailer. When the user arrives at the local retailer at an elapsed time that is less than the tier 1 goal, the user is rewarded the incentive offered by the local retailer. The time duration of the tier 1 goal is based on an average speed of the user when walking a distance from the current location of the user to the location of the local retailer. The tier 2 goal is a percentage of the tier 1 goal. For method 1000, the percentage is 90 percent, so that a time duration for the tier 2 goal is 90 percent of the time duration of the tier 1 goal.

At operation 1020, the user starts activation of the offer, for example by pressing Start button 510 on user interface screen 500 of user device 102. The selection of Start button 510 is received at user device 102.

At operation 1022, as a result of receiving a selection of Start button 510, a tier 1 goal, a tier 2 goal and countdown timers for the tier 1 and tier 2 target times are displayed on user device 102. The countdown timers show time remaining in the tier 1 tar and the tier 2 goal for the user to arrive at the location of the local retailer.

At operation 1024, timers are activated at user device 102 and data from an activity monitor on user device 102 are recorded in the progress database on user device 102. The data from the activity monitor comprises a number of steps taken by the user as the user walks to the local retailer.

At operation 1026, a determination is made that the tier 2 countdown timer has expired.

At operation 1028, a current GPS location of the user and the progress database are transmitted to server computer 110.

At operation 1030, a determination is made as to whether the user has achieved the tier 2 goal. The user will have achieved the tier 2 goal when the current GPS location of the user from operation 1028 corresponds to the GPS location of the local retailer. This indicates that the user has arrived at the local retailer at or before the time duration of the tier 2 goal has expired.

When the determination is made at operation 1030 that the tier 2 goal has been achieved, at operation 1038, an award corresponding to the tier 2 goal is redeemed by the user. The reward can comprise obtaining a discounted price of a product at the local retailer, receiving reward points from the local retailer or another reward.

When the determination is made at operation 1030 that the tier 2 goal has not been achieved, meaning that the user has not yet reached the location of the local retailer, at operation 1032, a determination is made that the tier 1 countdown timer has expired.

At operation 1034, a current GPS location of the user and the progress database are transmitted again to server computer 110.

At operation 1036, a determination is made as to whether the user has achieved the tier 1 goal. The user achieves the tier 1 goal when the current GPS location of the user from operation 1034 corresponds to the GPS location of the local retailer. This indicates that the user has arrived at the local retailer at or before the time duration of the tier 1 goal has expired.

When the determination is made at operation 1036 that the tier 1 goal has been achieved, at operation 1038, an award corresponding to the tier 1 goal is redeemed by the user. The reward can comprise obtaining a discounted price of a product at the local retailer, receiving reward points from the local retailer or another reward. Generally, the discounted price and the reward points for the tier 1 goal are less than for the tier 2 goal, because the tier 1 goal is easier to achieve than the tier 1 goal (more time allowed to walk to the retail store for the tier 1 goal than for the tier 2 goal).

Figure 12:
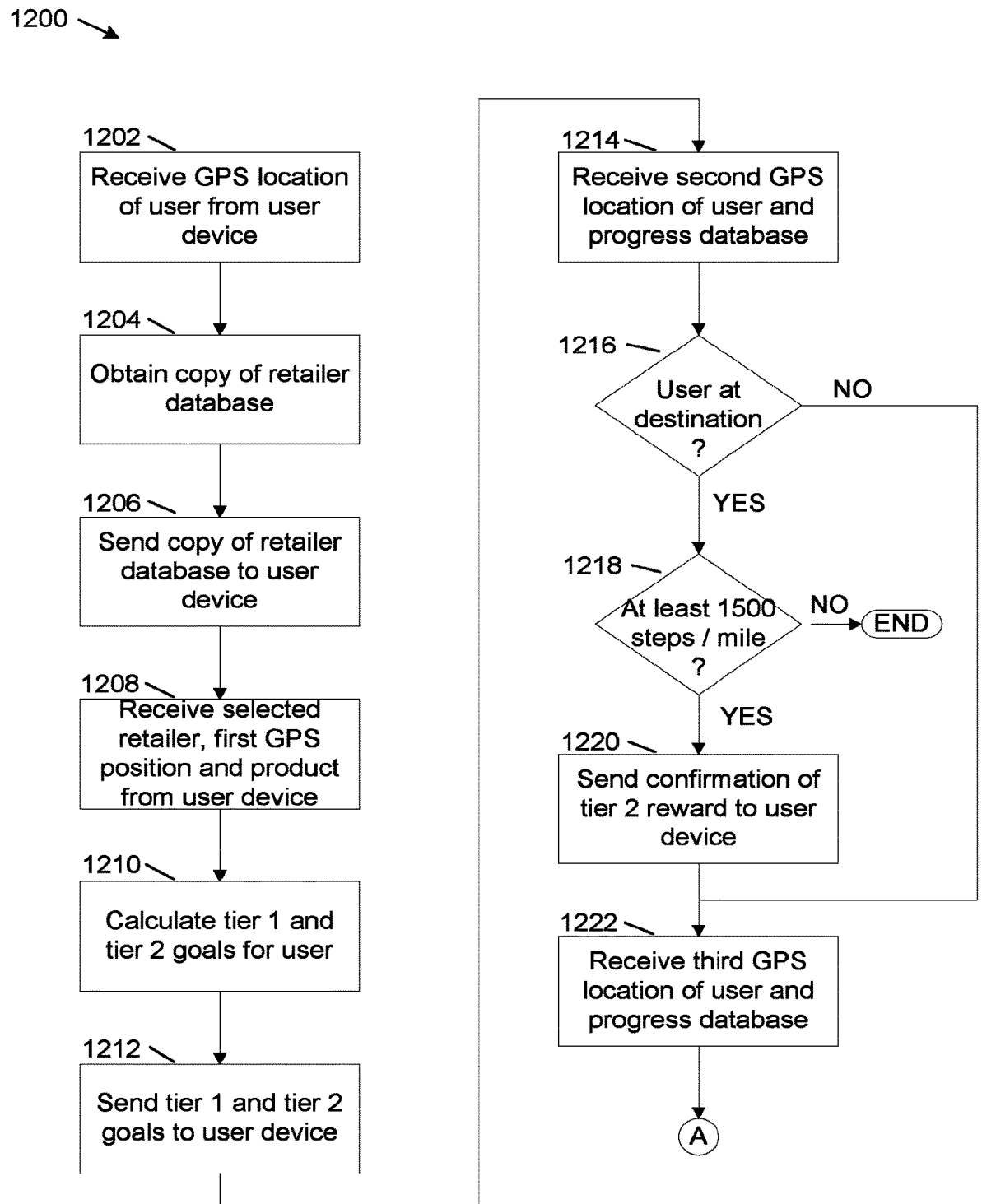
FIG. 12 shows a first part of an example method for determining a user's goal incentives.
Figure 13:
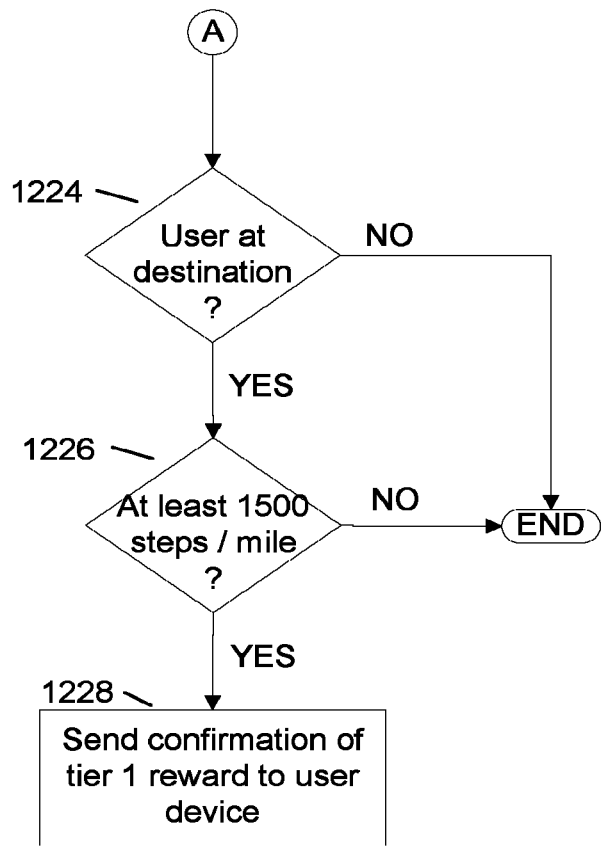
FIG. 13 shows a second part of the example method of FIG. 12.

FIGS. 12 and 13 show a flowchart of an example method implemented on server computer 110 for determining whether the user has achieved the tier 1 or tier 2 goals.

At operation 1202, a current GPS location of the user is received at server computer 110 from user device 102. The current GPS location of the user corresponds to a starting location for the user before activation of a financial incentive.

At operation 1204, server computer 110 accesses a retailer database, for example retailer database 116 and obtains a copy of the information stored on the retailer database. The information can include names of local retailers offering financial incentives for physical activity, GPS locations of the local retailers and available hours for the local retailers. In some implementations, server computer 110 can create a subset of the information that comprises only local retailers offering financial incentives that are located within a specific distance, for example two miles, from the current GPS location of the user.

At operation 1206, server computer 110 sends the information from the retailer database to user device 102.

At operation 1208, a selection of a local retailer is received from user device 102. A first GPS location for the local retailer and a product for which a financial incentive is offered by the local retailer is also received at user device 102.

At operation 1210, tier land tier 2 goals are calculated for the user. The tier 1 and tier 2 goals represent time durations within which the user needs to walk to the location of the local retailer in order to achieve a reward. A detailed explanation of how the tier 1 and tier 2 goals are calculated is provided later herein, in conjunction with FIG. 14.

At operation 1212, the tier 1 and tier 2 goals are sent to user device 102. As discussed earlier herein, user device 102 can display the tier 1 and tier 2 goals on at least two user interfaces of user device 102. See FIGS. 5 and 6.

At operation 1214, a second GPS location of user device 102 and the progress database are received at server computer 110. The second GPS location corresponds to a GPS location of user device 102 at a time when a countdown timer on user device 102 for the tier 2 goal expires. User device 102 can send the second GPS location and progress database to server computer 110, for example per operation 1028, when the tier 2 countdown timer expires.

At operation 1216, a determination is made as to whether the user is at the destination of the local retail store.

When a determination is made at operation 1216 that the user is at the retail store, at operation 1218, a determination is made as to whether the number of steps taken by the user (as obtained from the progress database) corresponds to an average of at least 1500 steps per mile. Because an average person's stride is approximately 2.5 feet long, it takes just over 2,000 steps to walk one mile. By ensuring that the user took at least 1500 steps per mile, a confirmation is made that the user arrived at the retail store on foot, rather than by car, bike or other means of transportation.

When a determination is made at operation 1218 that the user took at least 1500 steps per mile, at operation 1220 a confirmation of a reward corresponding to the tier 2 goal is sent to user device 102.

When a determination is made at operation 1218 that the user took less than 1500 steps per mile to arrive at the retail store, the user is denied both the tier 2 and tier 1 rewards and the method ends.

When a determination is made at operation 1216 that the user has not reached the destination at a time when the tier 2 countdown timer has expired, at operation 1222, a third GPS location of the user and the progress database is received at server computer 110. The third GPS location of the user corresponds to a time at which the tier 1 countdown time has expired, per operation 1034.

At operation 1224, a determination is made as to whether the user is at the destination of the local retail store.

When a determination is made at operation 1224 that the user is at the retail store, at operation 1226, a determination is made as to whether the number of steps taken by the user (as obtained from the progress database) corresponds to an average of at least 1500 steps per mile.

When a determination is made at operation 1226 that the user took at least 1500 steps per mile, at operation 1228 a confirmation of a reward corresponding to the tier 1 goal is sent to user device 102.

When a determination is made at operation 1226 that the user took less than 1500 steps per mile to arrive at the retail store, the user is denied the tier 1 reward and the method ends.

FIG. 14 shows a detailed flowchart of example method 1210 for calculating tier 1 and tier 2 goals for the user.

At operation 1402, the user's average speed is calculated in minutes per mile. The user's average speed can be calculated from the progress data base by comparing times and distances for at least two GPS locations as the user walks to the retail store.

At operation 1404, a distance between the user's starting position and the location of the retail store is calculated. The distance is calculated using the starting GPS location of the user, the GPS location of the retail store, and the preferred path between the starting position of the user and the location of the retail store.

At operation 1406, a time for the user the travel the distance from operation 1404 is calculated. The time is calculated using the average speed from operation 1402.

At operation 1408, the calculated time from operation 1406 is designated as the tier 1 goal time and sent to user device 102.

At operation 1410, a time corresponding to 90 percent of the tier 1 goal time is designated as the tier 2 goal time and sent to user device 102.

Figure 15:
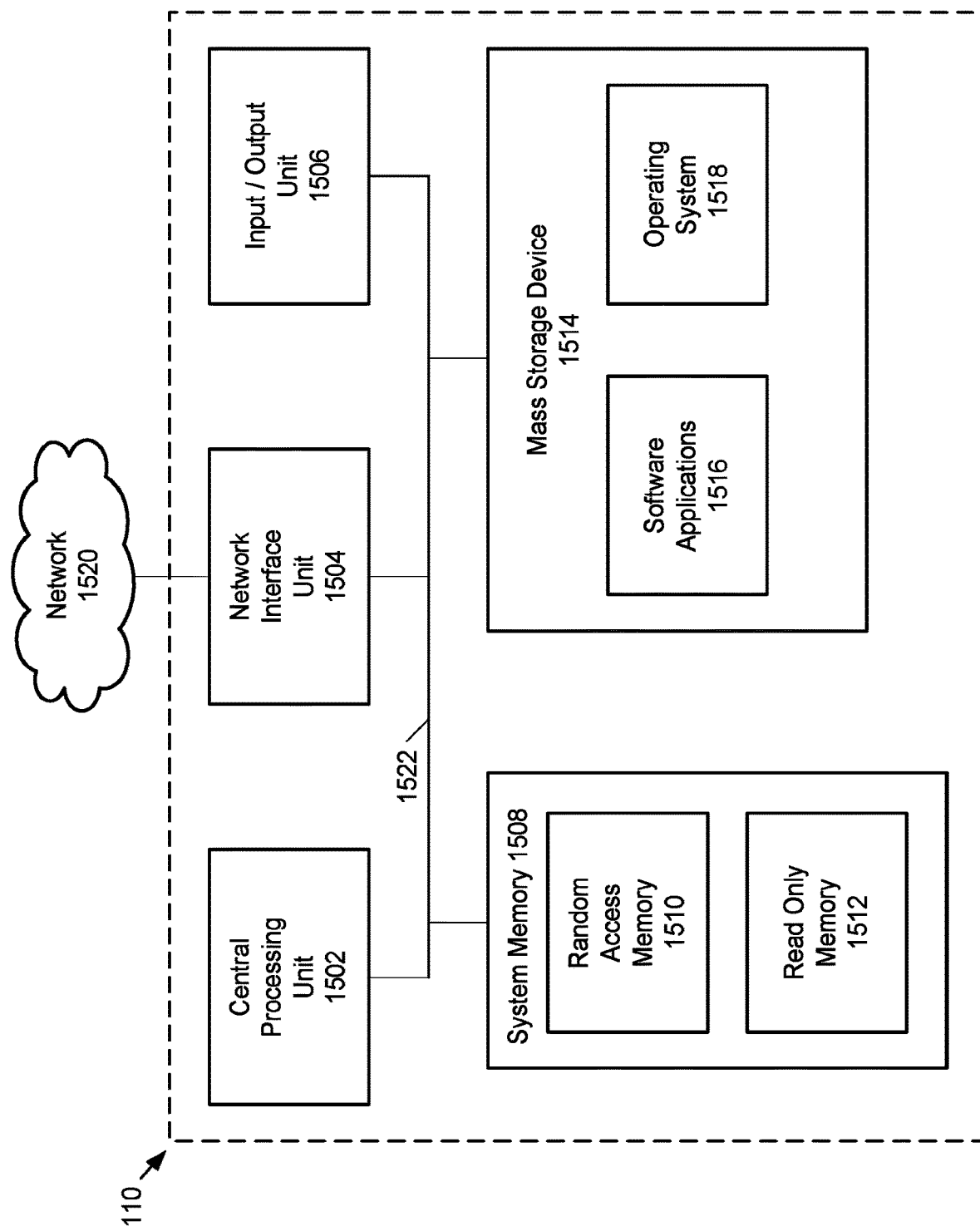
FIG. 15 shows example physical components of the server computer of FIG. 1.

As illustrated in the example of FIG. 15, server computer 110 includes at least one central processing unit ("CPU") 1502, a system memory 1508, and a system bus 1522 that couples the system memory 1508 to the CPU 1502. The system memory 1508 includes a random access memory ("RAM") 1510 and a read-only memory ("ROM") 1512. A basic input/output system that contains the basic routines that help to transfer information between elements within the server computer 110, such as during startup, is stored in the ROM 1512. The server computer 110 further includes a mass storage device 1514. The mass storage device 1514 is able to store software instructions and data. Some or all of the components of the server computer 110 can also be included in user device 102.

The mass storage device 1514 is connected to the CPU 1502 through a mass storage controller (not shown) connected to the system bus 1522. The mass storage device 1514 and its associated computer-readable data storage media provide non-volatile, non-transitory storage for the server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 110.

According to various embodiments of the invention, the server computer 110 may operate in a networked environment using logical connections to remote network devices through the network 1520, such as a wireless network, the Internet, or another type of network. The server computer 110 may connect to the network 1520 through a network interface unit 1504 connected to the system bus 1522. It should be appreciated that the network interface unit 1504 may also be utilized to connect to other types of networks and remote computing systems. The server computer 110 also includes an input/output controller 1506 for receiving and processing input from a number of other devices, including a touch user interface display screen, or another type of input device. Similarly, the input/output controller 1506 may provide output to a touch user interface display screen or other type of output device.

As mentioned briefly above, the mass storage device 1514 and the RAM 1510 of the server computer 110 can store software instructions and data. The software instructions include an operating system 1518 suitable for controlling the operation of the server computer 110. The mass storage device 1514 and/or the RAM 1510 also store software instructions, that when executed by the CPU 1502, cause the server computer 110 to provide the functionality of the server computer 110 discussed in this document. For example, the mass storage device 1514 and/or the RAM 1510 can store software instructions that, when executed by the CPU 1502, cause the server computer 110 to display received data on the display screen of the server computer 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a first electronic computing device for financially rewarding a user for physical activity, the method comprising:

identifying the location of the user;
sending the location of the user to a second electronic computing device;
receiving from the second electronic computing device available product categories associated with a financial incentive for physical activity;
on a display screen of the first electronic computing device, rendering a first user interface showing available product categories associated with one or more financial incentives for physical activity;
receiving from the user a first selection of a product from the available product categories;
as a result of receiving the first selection of the product, rendering a second user interface showing names of local retailers from which the product can be obtained and showing distances from a current location of the user to the local retailers;
receiving a second selection from the user of a local retailer;
sending the location of the selected local retailer to the second electronic computing device;
rendering a third user interface showing a map of a route between the current location of the user and the selected local retailer;
receiving from the second electronic computing device a target time for the user to reach the selected local retailer, wherein the target time includes a first tier goal and a second tier goal, wherein the first tier goal comprises a first time goal representing a time duration within which the user needs to travel from the current location of the user to the location of the selected local retailer in order to obtain a first financial incentive associated with the selected product, and wherein the second tier goal comprises a second time goal equal to a specified percentage of the first tier goal in which the user needs to travel from the current location of the user to the location of the selected local retailer in order to obtain a second financial incentive associated with the selected product; and
upon receiving the target time, rendering a fourth user interface continually showing progress towards at least one of: the first tier goal and the second tier goal.

\* \* \* \* \*